US011263588B2

(12) United States Patent
Agarwal et al.

(10) Patent No.: US 11,263,588 B2
(45) Date of Patent: Mar. 1, 2022

(54) INTELLIGENT DOCUMENT MANAGEMENT IN COMPUTING SYSTEMS (71) Applicant: Microsoft Technology Licensing, LLC, Redmond, WA (US)

(72) Inventors: Divya Agarwal, Seattle, WA (US); Gang Chen, Sammamish, WA (US); Kumar Rathnam Arjunan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 16/228,553

(22) Filed: Dec. 20, 2018

(65) Prior Publication Data

US 2020/0202300 A1 Jun. 25, 2020

(51) Int. Cl.
*G06F 16/00* (2019.01)
*G06Q 10/10* (2012.01)
*G06F 16/93* (2019.01)
*G06F 16/176* (2019.01)
*G06F 16/13* (2019.01)
*G06F 40/295* (2020.01)

(52) U.S. Cl.
CPC ........... *G06Q 10/105* (2013.01); *G06F 16/13* (2019.01); *G06F 16/176* (2019.01); *G06F 16/93* (2019.01); *G06F 40/295* (2020.01)

(58) Field of Classification Search
None
See application file for complete search history.

(56) References Cited

U.S. PATENT DOCUMENTS 5,303,379 A * 4/1994 Khoyi .............. G06F 8/76 717/166
5,369,778 A * 11/1994 San Soucie ............. G06F 9/543
6,049,776 A * 4/2000 Donnelly ....... G06Q 10/063112 705/7.14

(Continued)

FOREIGN PATENT DOCUMENTS

CN 106874474 A 6/2017

OTHER PUBLICATIONS

"Preventing and Managing Broken Links in SharePoint", Retrieved <<https://blogs.msdn.microsoft.com/bgeoffro/2008/10/22/preventing-and-managing-broken-links-in-sharepoint/>>, Oct. 22, 2008, 12 Pages.

(Continued)

*Primary Examiner* — Jean M Corrielus
(74) *Attorney, Agent, or Firm* — Liang IP, PLLC (57) ABSTRACT

Computer systems, devices, and associated methods of intelligent content management are disclosed herein. In one embodiment, a method includes scanning a document to determine whether one or more words in the document represent a resource in the file management system, the resource being a name of a person or a linked document in the file management system. In response to determining that one or more words in the document represents a resource, the method includes retrieving a resource record corresponding to the resource from a database in the computing system, the resource record having a data field containing data representing a current status of the resource and surfacing, in the document, the retrieved data of the current status of the resource to the user.

20 Claims, 8 Drawing Sheets

(56) References Cited

U.S. PATENT DOCUMENTS

| | | | |
|---|---|---|---|
| 6,493,731 B1* | 12/2002 | Jones | G06Q 10/10 |
| | | | 715/234 |
| 6,694,353 B2 | 2/2004 | Sommerer | |
| 7,032,124 B2 | 4/2006 | Greenbaum | |
| 7,689,667 B2 | 3/2010 | Lal | |
| 8,966,445 B2* | 2/2015 | Ahlgren | G06Q 10/06 |
| | | | 717/120 |
| 8,990,886 B2* | 3/2015 | Lim | H04L 41/0893 |
| | | | 726/1 |
| 9,298,839 B2 | 3/2016 | Carter et al. | |
| 9,367,571 B2* | 6/2016 | Kelley | G06F 16/24 |
| 9,703,978 B2* | 7/2017 | Lim | H04L 41/0893 |
| 2002/0019827 A1* | 2/2002 | Shiman | G06F 16/93 |
| 2012/0143817 A1* | 6/2012 | Prabaker | G06F 16/176 |
| | | | 707/608 |
| 2013/0124646 A1 | 5/2013 | Kraft et al. | |
| 2013/0218829 A1* | 8/2013 | Martinez | G06Q 10/10 |
| | | | 707/608 |
| 2015/0046493 A1* | 2/2015 | Akselrod | G06F 16/9566 |
| | | | 707/781 |
| 2015/0193389 A1 | 7/2015 | Rose | |
| 2016/0224798 A1* | 8/2016 | Lim | G06F 16/13 |

OTHER PUBLICATIONS

Hughes, John, "How to Automatically Find and Fix Broken Links in WordPress", Retrieved <<https://web.archive.org/web/20180402011349/https:/themeisle.com/blog/fix-broken-links-in-wordpress/>>, Mar. 30, 2018, 16 Pages.

"How to Find and Fix Broken Links on Your Website", https://www.wordstream.com/blog/ws/2010/06/02/how-to-find-and-fix-broken-links, Jun. 2, 2010, 13 Pages.

"International Search Report and Written Opinion Issued in PCT Application No. PCT/US2019/065571", dated Mar. 17, 2020, 12 Pages.

* cited by examiner

INTELLIGENT DOCUMENT MANAGEMENT IN COMPUTING SYSTEMS

BACKGROUND

Corporations, schools, charities, government offices, and other types of enterprises often deploy private or virtually private computer networks commonly referred to as intranets. Such intranets can allow members of an enterprise to securely share information within the enterprise. For example, an intranet can include a file management system that is configured to store, track, or otherwise manage internal documents of an enterprise. In contrast, the term "internet" typically refers to a public computer network among individuals and enterprises. An example internet has billions interconnected of computer devices worldwide based on the TCP/IP protocol, and is commonly referred to as the Internet.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Intranets can provide members of an enterprise ability to store and manage various types of content within the enterprise. For example, an intranet can include one or more repositories that store documents, videos, audios, or other types of content items. The intranet can also include a file management system configured to apply access control, retention or other suitable content management policies. For instance, certain categories of documents (e.g., design specifications, contacts, invoices, tax returns, etc.) may be accessible to one group of users but not another. In another example, certain categories of documents (e.g., purchase orders, health reports, etc.) may be purged after a period different than other categories of documents.

The file management system, however, typically does not track status of information or resource contained in the various documents or content items. The lack of tracking may cause difficulties to members of the enterprise for obtaining update-to-date information from the documents. For example, a document regarding a project may contain resources that are linked to additional information in the file management system. For instance, some resources can include names of project members (or an organization, team, etc.) of the project. The names can be linked to additional information related to the project members, such as contact information, location, position in the enterprise, etc. Other example resources can include filenames to linked documents regarding the project (e.g., design specifications, progress reports, etc.), a team website address, a team name, and/or other project information.

As time lapses after creation or modification of the document, some of the resources contained in the original document may be out-of-date or otherwise no longer valid. For instance, a project member may have left the team, and thus his/her name referred to in the project document as the owner of the document is no longer valid. In another example, a document corresponding to a filename mentioned in the project document may have been changed, deleted, moved, merged with other documents, or otherwise becoming unavailable. However, the file management system typically does not track such changes of information contained in the documents, and thus cannot indicate such occurrence of such changes and/or provide updated information to readers of the document. As such, confusions to the readers may result. The readers may have to spend additional time and effort to clear the confusions, and thus hinder productivity of the readers.

Several embodiments of the disclosed technology can address at least some of the foregoing drawbacks by implementing a resource manager configured to track status of various resources contained in or referred to in stored documents, videos, audios, or other types of content items. As used herein, a "resource" generally refers to a placeholder that has additional linked information in the file management system. In one example, a resource can include a person's name as a placeholder for additional personal information contained in the file management system. In another example, a resource can include a filename corresponding to another document stored in the file management system. In further examples, a resource can include a name of a website/webpage, a name of a team, a name of a team website, or other suitable types of placeholders.

In certain implementations, machine learning can be utilized to develop models for recognizing resources of various types in documents. For example, the resource manager can include a resource developer that is configured to utilize a "neural network" or "artificial neural network" to "learn" or progressively improve performance of tasks by studying known examples. A neural network can include multiple layers of objects generally refers to as "neurons" or "artificial neurons." Each neuron can be configured to perform a function, such as a non-linear activation function, based on one or more inputs via corresponding connections. Artificial neurons and connections typically have a contribution value that adjusts as learning proceeds. The contribution value increases or decreases a strength of an input at a connection. The artificial neurons can be organized in layers. Different layers may perform different kinds of transformations on respective inputs. Signals typically travel from an input layer, to an output layer, possibly after traversing one or more intermediate layers. Thus, by using a neural network, the resource manager can provide a set of weights of the corresponding features that can be used as one or more resource models for identifying various types of resources in the content items.

In other implementations, the resource developer can be configured to recognize resources of various types based on one or more user configured rules or via other suitable techniques. For example, one rule can be configured to identify a linked document by recognizing that a weblink is attached to certain words or phrases in a document. In another example, another rule can be configured to identify a person's name based on character capitalization of successive words in a document. In further implementations, the resource developer can be configured to utilize a combination of the resource models developed using a neural network, user configured rules, and/or other suitable techniques to identify resources of various types in documents.

A resource processor can be configured to scan a document to detect potential resources in the document. In one embodiment, the resource processor can be configured to detect a resource in a document based on the models and/or rules when, for instance, a user is composing, reading, editing, or perform other suitable actions on the document. Upon detecting one or more words or phrases in the document correspond to a potential resource, the resource processor can be configured to determine whether a resource record corresponding to the detected resource already exists in a resource database. In response to determining that a resource record does not exist in the resource database, the resource processor can be configured to prompt the user for input on whether to create a resource record for the detected resource. In response to receiving a confirmation from the user to create a resource record, the resource creator can be configured to create the resource record and optionally prompt the user for additional information (e.g., a current status of the resource) to be included in the created resource record. Upon receiving additional information from the user, the resource creator can be configured to store the created resource record with the received additional information in the resource database with a status to the resource based on the additional information, or via other suitable techniques.

In response to determining that a corresponding resource record already exist in the resource database, the resource processor can be configured to surface or otherwise provide information (e.g., a status of the resource) in the resource record to the user. Examples of the status can include "active," "inactive," "valid," "invalid," "original," "modified," "alive," "dead," or other suitable types of indicator of state. For instance, in the project document example above, the resource processor can be configured to indicate to a reader that a project member has left the team based on a status of being inactive, for example, by providing a balloon next to his/her name in the project document. In certain implementations, the resource manager can be configured to obtain such personnel change information by consulting a user directory provided by a directory service in the enterprise. In other implementations, the personnel change information may be manually entered or via other suitable techniques. In any of the foregoing implementations, the resource processor can also be configured to provide a history of the resource, for instance, by indicating that another person (e.g., "Jane Doe") is now a project member in place of the project member who has left.

Upon indicating an inactive, invalid, or other suitable types of out-of-date status or state for a resource, the resource processor can also be configured to query and update information related to the resource. For example, the resource processor can be configured to indicate that a name of a linked document has a status of invalid because the linked document cannot be found at a network address attached to a filename of the document. In certain embodiments, the resource processor can be configured to query the user for an updated link or network address for the linked document. In response to receiving the updated link, the resource manager can be configured to update the corresponding resource record and modify the status of the resource to, for instance, "active," "valid," or other suitable indicators. In other embodiments, the resource manager can be configured to actively crawl documents in the file management system for one or more documents that are generally similar in content to the original linked document. The resource manager can then provide the one or more similar documents to the user for selection. Upon receiving a user selection, the resource manager can be configured to update the web address of the linked document in the document, as well as the corresponding resource record to mark the name of the linked document as, for example, "valid."

Several embodiments of the disclosed technology can thus intelligently manage information contained in documents that are stored in a file management system via creating and updating resource records for resources contained in the documents. For example, when a document is surfaced to a reader, the resource manager can be configured to surface to the reader whether a resource (e.g., a linked document or the name of a person) in the document is still valid or available. Thus, the reader no longer must perform due diligence on the status of the resource before utilizing the information associated with the resource. As such, confusions caused by out-of-date information can be reduced to increase productivity of the reader when compared to other file management systems.

DETAILED DESCRIPTION

Certain embodiments of systems, devices, components, modules, routines, data structures, and processes for intelligent document management are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, the term "content item" generally refers to an item of information accessible via a computer network. For example, a content item can include a document file containing text stored in a network repository and accessible via the computer network. The document file can be in plain text format, Word® format, Portable Document Format ("PDF"), Hypertext Markup Language ("HTML"), Extensible Markup Language ("XML"), or other suitable formats. In other examples, a content item can also a file containing images, sounds, videos, or animations in addition to or in lieu of text. In additional examples, a content item can include a website with one or more webpages accessible via the computer network. In further examples, a content item can include a blog site, discussion forum, electronic commerce site, or other suitable types of file.

Also used herein, a "resource" generally refers to a placeholder that has additional linked information in a file management or other suitable types of computing system. In one example, a resource can include a person's name as a placeholder for additional personal information contained in the file management system. In another example, a resource can include a filename corresponding to another document stored in the file management system. In further examples, a resource can include a name of a website/webpage, a name of a team, a name of a team website, a name of an image, or other suitable types of placeholders. In yet further examples, a resource can include other suitable types of Object Linking & Embedding (OLE) objects.

In certain file management systems, current status of information contained in the various documents or content items. The lack of tracking may cause difficulties to readers of the documents for obtaining update-to-date information from the documents. For example, a document regarding a project may contain people's names or filenames of additional documents. As time lapses though, a person referred to by name in the project document may change position, quit, or otherwise no associated with the project document. An additional document referred to by filename in the document may be deleted, moved, or otherwise cannot be located any more. Such change information is typically not tracked. As such, confusions to subsequent readers of the project document may result. The readers may have to spend additional time and effort to clear the confusions, and thus hinder productivity of the readers.

Several embodiments of the disclosed technology can address at least some of the foregoing drawbacks by implementing a resource manager configured to track status of various information or resources contained in or referred to in stored documents, videos, audios, or other types of content items. For example, documents can be scanned for potential resources, and corresponding resource records can be created and stored in a database in the file management system. The resource records can include additional metadata or information regarding the resources such as, for instance, a current status of the resources. Example resources can include "active," "inactive," "valid," "invalid," "original," "modified," "alive," "dead," or other suitable types of indicator of state, As such, when a document is surfaced to a reader at a later date, the resource manager can be configured to surface to the reader whether a particular resource (e.g., a linked document or the name of a person) in the document is still valid or available. Thus, the reader no longer must perform due diligence on the status of the resource before utilizing the information associated with the resource. As such, confusions caused by out-of-date information can be reduced to increase productivity of the reader when compared to other file management systems, as described in more detail below with reference to FIGS. 1-5.

Figure 1:
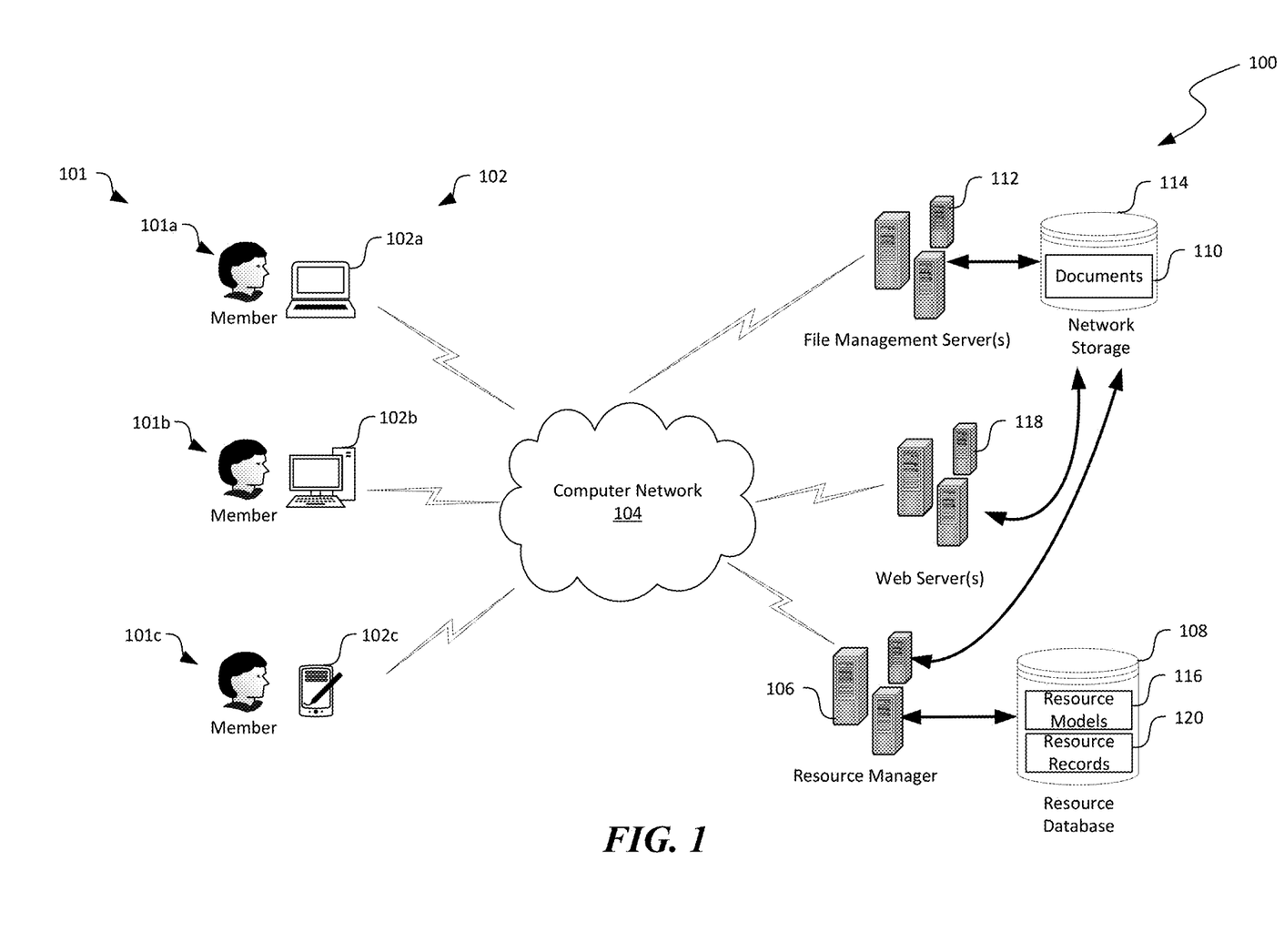
FIG. 1 is a schematic diagram illustrating a distributed computing system implementing intelligent document management in accordance with embodiments of the disclosed technology.

FIG. 1 is a schematic diagram illustrating a distributed computing system 100 implementing intelligent document management in accordance with embodiments of the disclosed technology. As shown in FIG. 1, the distributed computing system 100 can include a computer network 104 interconnecting client devices 102, a resource manager 106, a file management server 112, and one or more web servers 118. The computer network 104 can include an enterprise intranet, a social network, the Internet, or other suitable types of network. Even though embodiments of the disclosed technology are described below in the context of an enterprise intranet, in other embodiments, the disclosed technology can also be implemented in a computer-based social network, a cloud-based file management system, or other suitable types of distributed computer systems.

As shown in FIG. 1, the distributed computing system 100 can also include a resource database 108 operatively coupled to the resource manager 106 and a network storage 114 operatively coupled to the file management server 112. As shown in FIG. 1, the network storage 114 can be configured to store documents 110 accessible to the client devices 102 via the computer network 104. Though not shown in FIG. 1, the network storage 114 can also store other suitable types of records, such as access control policies, document retention policies, document modification policies, and/or other suitable types of policies. The resource database 108 can be configured to store records of resource models 116 and resource records 120 useful for tracking resources in documents 110 in the network storage 114, as described in more detail later.

Even though particular components and associated arrangements of the computing system 100 are shown in FIG. 1, in other embodiments, the distributed computing system 100 can include additional and/or different components. For example, in certain embodiments, the resource database 108 and the network storage 114 can be combined into a single physical and/or logical storage space. In other embodiments, the resource models 116 can be stored in the network storage 114 instead of the resource database 108, or in other suitable locations accessible via the computer network 104. In further embodiments, the distributed computing system 100 can also include caching servers, load balancers, or other suitable components.

The client devices 102 can individually include a computing device that facilitates access to the resource database 108 via the computer network 104 by members 101 (identified as first, second, and third members 101a-101c). For example, in the illustrative embodiment, the first client device 102a includes a laptop computer. The second client device 102b includes a desktop computer. The third client device 102c includes a tablet computer. In other embodiments, the client devices 102 can also include smartphones or other suitable computing devices. Even though three members 101 are shown in FIG. 1 for illustration purposes, in other embodiments, the computing system 100 can facilitate any suitable number of members 101 access to the documents 110 in the network storage 114 via the computer network 104.

In certain embodiments, the resource manager 106, the file management server 112, and the web servers 118 can each include one or more interconnected computer servers, as shown in FIG. 1. In other embodiments, the foregoing components of the computing system 100 can each include a cloud-based service hosted on one or more remote computing facilities such as datacenters. In further embodiments, certain components (e.g., the web servers 118) may be omitted from the computing system 100 and be provided by external computing systems (not shown).

The web servers 118 can be configured to provide one or more websites or webpages accessible by the members 101 via the computer network 104 to create, retrieve, edit, or perform other suitable operations on the documents 110 in the network storage 114. For example, in one embodiment, the web servers 118 can be configured to provide an enterprise internal website that allows the members 101 to securely exchange information and to cooperate on performing tasks. In other embodiments, the web servers 118 can also be configured to provide a social network website that allows the members 101 to post documents 110, comment on one another's documents 110, share and/or recommend documents 110 with additional members 101, or perform other suitable actions. In certain embodiments, the web servers 118 can also be configured to receive and store the documents 110 in the network storage 114. In other embodiments, the distributed computing system 100 can further include a database server (not shown) or other suitable components configured to perform the foregoing functions.

The file management server 112 can be configured to implement various policies to the documents 110 to facilitate access efficiency, security, or other suitable functions. For example, in one embodiment, the file management server 112 can implement access control policies such that certain class, type, category, or other suitable grouping of the documents 110 can be accessible to the members 101, or access rights of the members 101 to certain document may be granted or revoked by an administrator. In another embodiment, the file management server 112 can also implement file retention policies such that certain class, type, category, or other suitable grouping of the documents 110 can be automatically deleted or purged from the network storage 114. In further embodiments, the file management server 112 can implement other suitable types of policies in order to regulate storing, editing, accessing, purging, or other suitable operations on the documents 110.

The resource manager 106 can be configured to develop resource models 116 useful for identifying resources in the documents 110 in the network storage 114. In certain embodiments, the resource manger 106 can develop the resource models 116 via machine learning, for instance, by utilizing a "neural network," for recognizing resources of various types in documents. In other embodiments, the resource manager 106 can be configured to recognize resources of various types based on one or more user configured rules or via other suitable techniques. For example, one rule can be configured to identify a linked document by recognizing that a weblink is attached to certain words or phrases in a document. In another example, another rule can be configured to identify a person's name based on character capitalization of successive words in a document, or via look up of an internal member directory. In further implementations, the resource manager 106 can be configured to utilize a combination of the resource models developed using a neural network, user configured rules, and/or other suitable techniques to identify resources of various types in documents.

In certain implementations, the foregoing development of the resource models 116 can be performed by the resource manager 106 via off-peak backend batch processing on the stored documents 110. In other implementations, the foregoing development of the resource models 116 can be performed when the documents 110 are viewed, created, edited, or otherwise in use by the members 101 via real-time or near real-time processing. In further implementations, the development of the resource models 116 can be performed by another component (not shown) of the distributed computing system 100 instead of the resource manager 106. As such, the resource models 116 can be provided to the resource manager 106 for access and utilization in the resource database 108.

The resource manager 106 can also be configured to recognize a resource in a document 110 when a member 101 is viewing the document 110 and provide additional information of the resource to the member 101. For example, in one embodiment, the resource manager 106 can be configured to provide a current status of the resource to the member 101. The current status may indicate that the resource in the document 110 is currently valid, available, accessible, or otherwise up-to-date. The current status may also indicate that the resource in the document 110 is currently invalid, unavailable, inaccessible, or otherwise out-of-date. As such, the member 101 viewing the document 110 can efficiently determine whether information or resources contained in the document 110 is either current or stale. Thus, productivity of utilizing the information in the document 110 may be improved. Certain embodiments of components and functions of the resource manager 106 are described in more detail below with reference to FIGS. 2A-5.

2A-2D are schematic diagrams illustrating certain hardware/software components of the distributed computing system 100 of FIG. 1 during certain stages of operation in accordance with embodiments of the disclosed technology. In FIGS. 2A-2D and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Figure 2A:
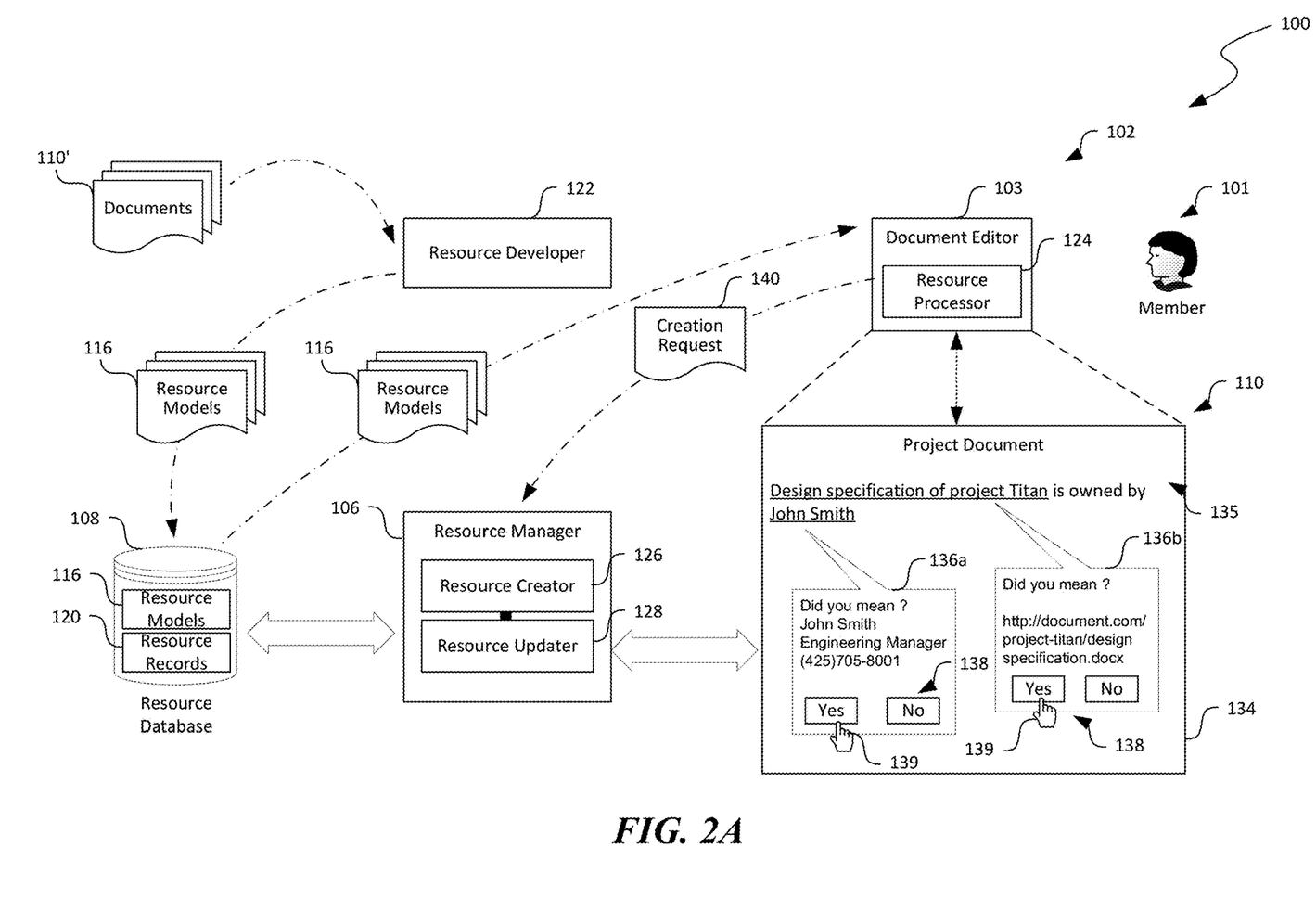
FIGS. 2A-2D are schematic diagrams illustrating certain hardware/software components of the distributed computing system 100 of FIG. 1 during certain stages of operation in accordance with embodiments of the disclosed technology.

As shown in FIG. 2A, the distributed computing system 100 can include a resource developer 122 configured to develop the one or more resource models 116. In the illustrated embodiment, the resource developer 112 is shown in FIG. 2A as an independent component from the resource manager 106 and hosted by, for example, the file management server 112 (FIG. 1) or other suitable types of servers in the distributed computing system 100. In other embodiments, the resource developer 122 can be a part of the resource manager 106. In further embodiments, the resource developer 122 can be omitted and be hosted by one or more servers outside of the distributed computing system 100.

The resource developer 122 can be configured to develop the one or more resource models 116 using various techniques. For example, the resource developer 122 can be configured to utilize machine learning to develop the resource models 106 for recognizing resources of various types in a training set of documents 110'. The training set of documents 110' includes documents 110' with previously identified resources. The resource developer 122 can be configured to utilize a "neural network" or "artificial neural network" to "learn" or progressively improve performance of tasks by studying known examples. A neural network can include multiple layers of objects generally refers to as "neurons" or "artificial neurons." Each neuron can be configured to perform a function, such as a non-linear activation function, based on one or more inputs via corresponding connections. Artificial neurons and connections typically have a contribution value that adjusts as learning proceeds. The contribution value increases or decreases a strength of an input at a connection. The artificial neurons can be organized in layers. Different layers may perform different kinds of transformations on respective inputs. Signals typically travel from an input layer, to an output layer, possibly after traversing one or more intermediate layers. Thus, by using a neural network, the resource developer 122 can provide a set of weights of the corresponding features in the documents 110' that can be used as one or more resource models 116 for identifying various types of resources in additional documents 110.

In other implementations, the resource developer 122 can be configured to recognize resources of various types based on one or more user configured rules or via other suitable techniques. For example, one rule can be configured to identify a linked document 110 by recognizing that a weblink is attached to certain words or phrases in a document. In another example, another rule can be configured to identify a person's name based on character capitalization of successive words in a document. In further implementations, the resource developer 122 can be configured to utilize a combination of the resource models developed using a neural network, user configured rules, and/or other suitable techniques to identify resources of various types in documents 110. Upon completion of such development, the resource models 116 can then be stored in the network repository for access by other components of the resource manager 106.

As shown in FIG. 2A, the client device 102 can execute suitable instructions to provide a document editor 103 configured to view, create, edit, or perform other suitable operations on documents 110 in the network storage 114 (FIG. 1). In certain embodiments, the document editor 103 can be a standalone application and includes a resource processor 124, as an add-in, extension, or other suitable types of component configured to scan a document 110 for resources based on the resource models 116. In other embodiments, the document editor 103 can include a web-based document editor. In such embodiments, the resource processor 124 can be a part of the resource manager 106 having access to the resource models 116 in the resource database 108.

In the illustrated example, the document 110 includes a project document having multiple words and/or phrases. For example, the document 110 includes a title, i.e., "Project Document" and a sentence in a body section, i.e., "Design specification of project Titan is owned by John Smith." The resource processor 124 can be configured to scan the words and/or phrases of the document 110 to recognize that one or more of the words and/or phrases correspond to a resource based on the resource models 116. In the illustrated example, a copy of the resource models 116 is transmitted to the client device 102. In other examples, the resource processor 124 can access the resource models 116 via the computer network 104 (FIG. 1) without having a copy on the client device 102.

In one embodiment, the resource processor 124 can be configured to detect a resource in the document 110 based on the resource models 116 when, for instance, a member 101 is composing, reading, editing, or perform other suitable actions on the document 110. For instance, in the illustrated example, the resource processor 124 can be configured to identify that the phrase "Design specification of project Titan" and "John Smith" can individually correspond to a resource. Upon detecting one or more words or phrases in the document 110 correspond to a potential resource, the resource processor 124 can be configured to determine whether a resource record 120 corresponding to the detected resource already exists. In one embodiment, the resource processor 124 can query the resource database 108 to determine whether a resource record 120 exists for the identified potential resources. In other embodiments, the resource processor 124 can request the resource manager 106 (or a component thereof) for querying the resource database 108. In further embodiments, a copy of the resource records 120 (or portions thereof) may be stored at the client device 102 to be queried by the resource processor 124.

In response to determining that a resource record 120 does not exist in the resource database 108 for the identified potential resources, the resource processor 124 can be configured to prompt the member 101 for input on whether to create a resource record 120 for the detected resources. For example, as shown in FIG. 2A, the resource processor 124 can be configured to instruct the document editor 103 to output two pop-up windows, balloons, or other suitable types of interface elements 136 (shown as first and second example balloons 136a and 136b for illustration purposes). The first example balloon 136a can include text output as follows:

Did you mean?
John Smith
Engineering Manager
(425)705-8000 and input elements for indicating approval or disapproval, i.e., "Yes" and "No" buttons 138. The second example balloon 136b can include another text output as follows:

Did you mean?
http://document.com/project-titan/design specification.docx and input elements for indicating approval or disapproval, i.e., "Yes" and "No" buttons 138.

In response to receiving a confirmation from the member 101, for instance, as shown in FIG. 2A as the cursors 139, the resource processor 124 can be configured to transmit the user input along with the identified resources (i.e., "John Smith" and "Design specification of project Titan"), an identification of the document 110 in the network storage 114, or other suitable information to the resource manager 106 as a creation request 140. Upon receiving the creation request 140, the resource creator 126 can be configured to create the resource record 120 and optionally prompt the member 101 for additional information (e.g., a current status of the resource) to be included in the created resource record 120. Upon receiving additional information from the user, the resource creator 126 can be configured to update the created resource record 120 and store the created resource record 120 with the received additional information in the resource database 108 with a status to the resource based on the additional information, or via other suitable techniques. In some embodiments, the created resource record 120 can be updated only after receiving a threshold number (e.g., three) of input to update the resource record 120.

Figure 2B:
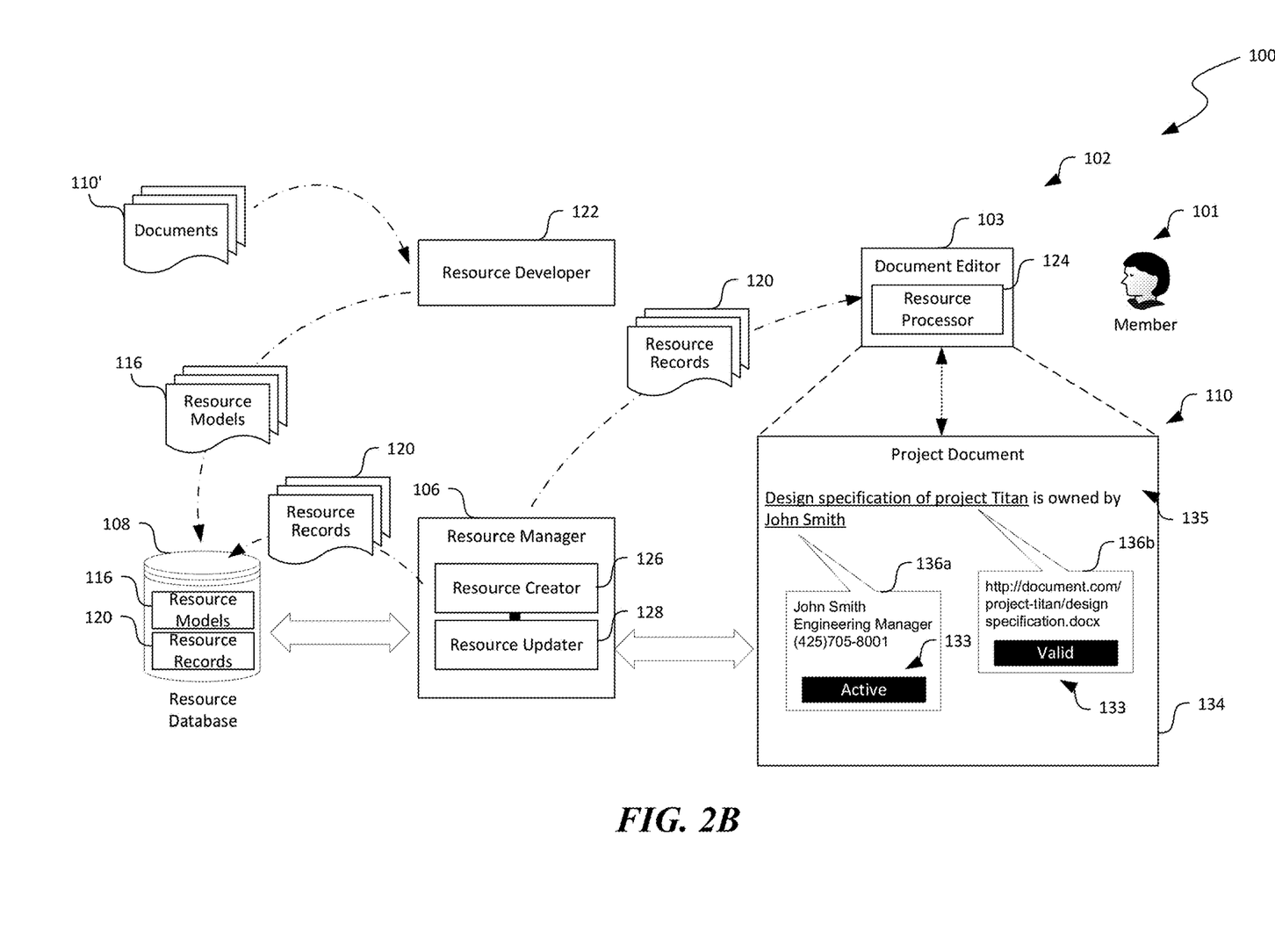

FIG. 2B illustrates an example operation stage during which the resource processor 124 determines that a resource record 120 already exists in the resource database 108 for each of the identified resources. In response, the resource processor 124 can retrieve the relevant resource records 120 from the resource database 108 and surface suitable information in the resource records 120 to the member 101. For example, as shown in FIG. 2B, the resource processor 124 can be configured to instruct the document editor 103 to surface or otherwise provide information (e.g., a status of the resource) in the resource records 120 to the member 101. Examples of the status can include "active," "inactive," "valid," "invalid," "original," "modified," "alive," "dead," or other suitable types of indicator of state. For instance, in the illustrated example in FIG. 2B, the resource processor 124 can be configured to indicate to the member that a team member "John Smith" is still active, and the document 110 corresponding to "Design specification of project Titan" is still available to be accessed via the link "http://document-.com/project-titan/design specification.docx" via interface elements 133 (shown as status badges for illustration purposes). As such, the member 101 can have confidence that information contained in the document 110 regarding the design specification and the owner thereof is still valid.

Figure 2C:
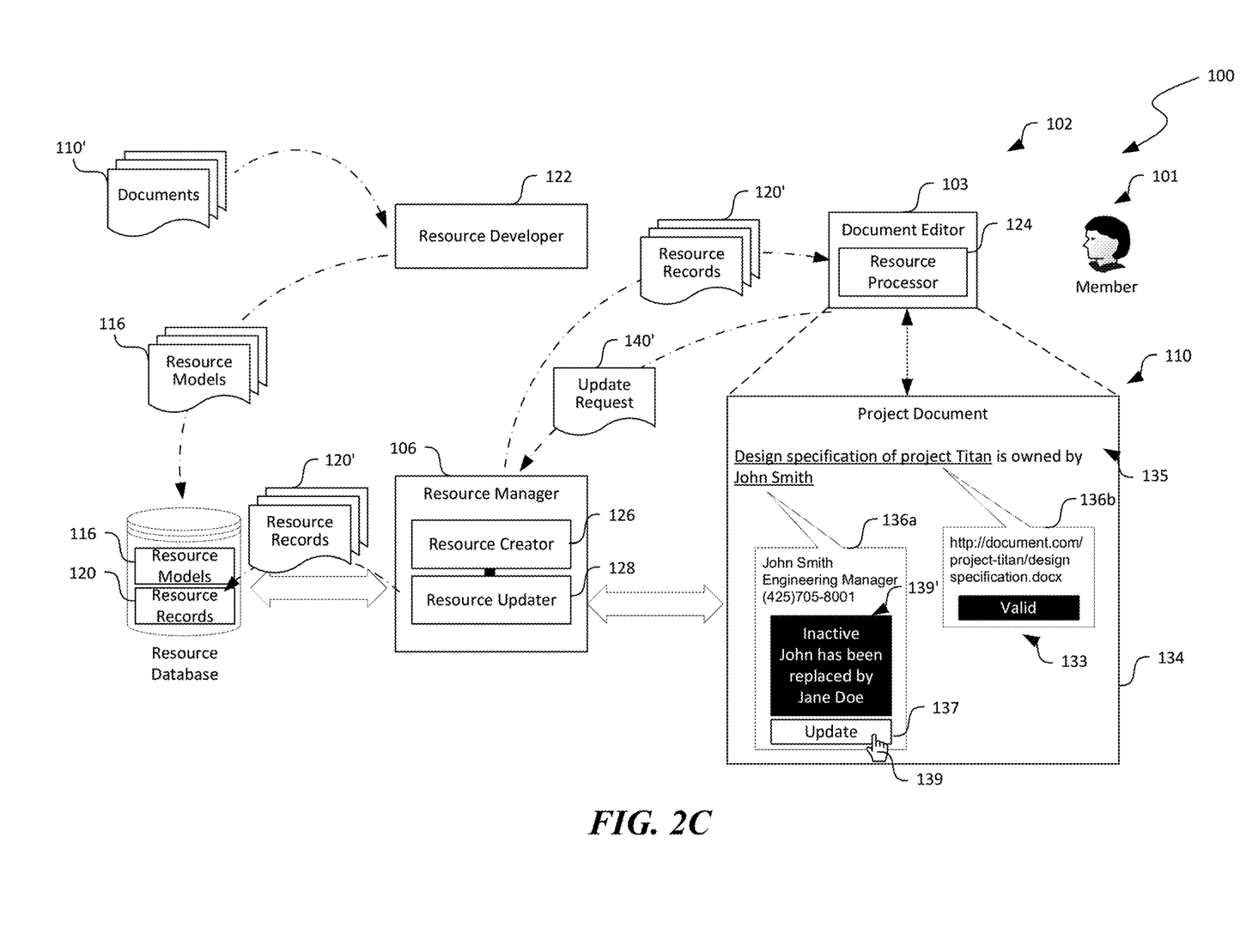

On the other hand, as shown in FIG. 2C, the resource processor 124 can also be configured to indicate that a project member (i.e., "John Smith") has left the project team based on a status of being inactive, for example, in the retrieved resource record 120. For instance, the resource processor 124 can be configured to surface an interface element containing text as follows:

Inactive

John has been replaced by Jane Doe

In certain implementations, the resource manager 106 can be configured to obtain such personnel change information by consulting a user directory (not shown) provided by a directory service in the enterprise. In other implementations, the personnel change information may be manually entered or via other suitable techniques. In any of the foregoing implementations, the resource processor 124 can also be configured to provide a history of the resource, for instance, by indicating that another person (e.g., "Jane") is now a project member in place of the project member who has left, i.e., "John Smith." The resource processor 124 can also be configured to cause the document editor 103 to output another interface element (illustrated in FIG. 2C as a button 137) for receiving another user input for updating the resource record 120 corresponding to the resource "John Smith." Upon receiving another user input on the button 137, the resource processor 124 can transmit an update request 140' to the resource manager 106. The update request 140" can include identification of the resource, the document 110, and/or other suitable information.

Figure 2D:
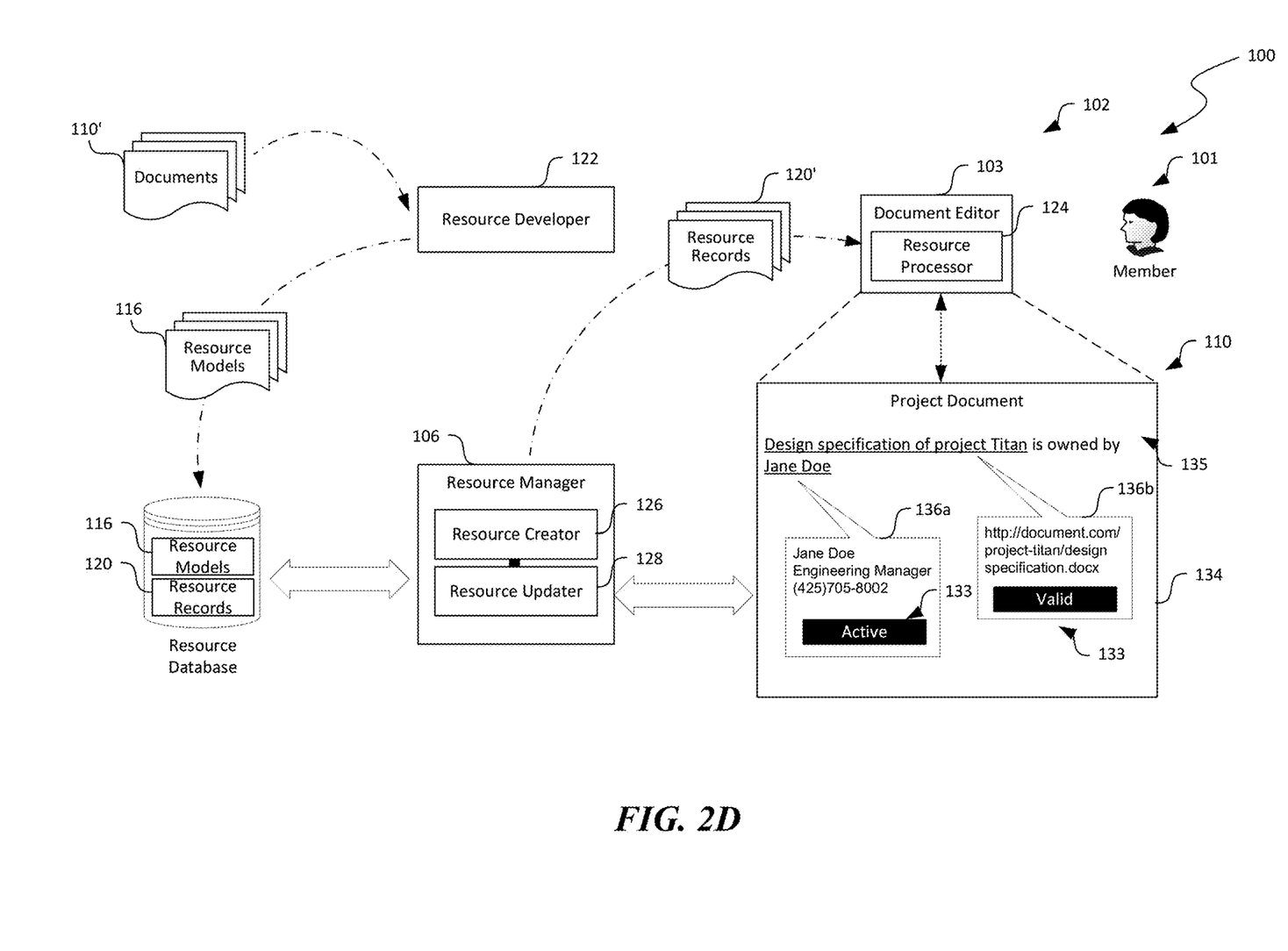

Upon receiving the update request 140', in certain embodiments, the resource updater 128 can be configured to update the resource records 120' in the resource database 108 to reflect a change in status of the resource, a replacement information, or other suitable types of information. In other embodiments, the resource updater 128 can also be configured to cause changes in the document 110, for example, by substituting "John Smith" with "Jane Doe," create another resource record 120 corresponding to "Jane," setting appropriate status values for the created resource record 120, and/or perform other suitable operations. In further embodiments, the resource updater 128 can be configured to make the foregoing changes to all resource records 120 linked to that of "John Smith" and/or documents 110 in the network storage 114 that contains the resource "John Smith." As such, resources in the document 110 and other documents 110 containing "John Smith" can be updated automatically, as shown in FIG. 2D.

Figure 3A:
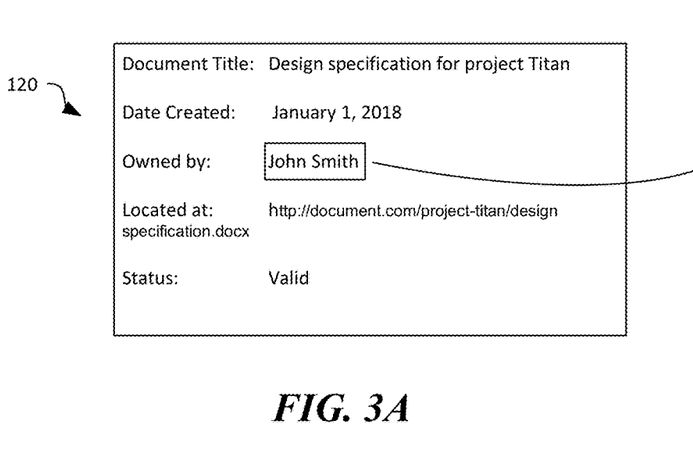
FIGS. 3A-3D are schematic diagrams illustrating example resource records in accordance with embodiments of the disclosed technology.

FIGS. 3A-3D are schematic diagrams illustrating example resource records 120 in accordance with embodiments of the disclosed technology. As shown in FIG. 3A, the example resource record 120 can be associated with a document 110 (FIG. 1). In the illustrated embodiment, the example resource record 120 contains multiple example record fields such as "Document Title," "Date Created," "Owned by," "Located at," and "Status." In other embodiments, the example resource record 120 can include other suitable record fields. Each of the record fields can contain a corresponding record value. For instance, the "Document Title" field can contain "Design specification for project Titan." The "Owned by" field can contain "John Smith." The "Status" field can contain "Valid."

Figure 3B:
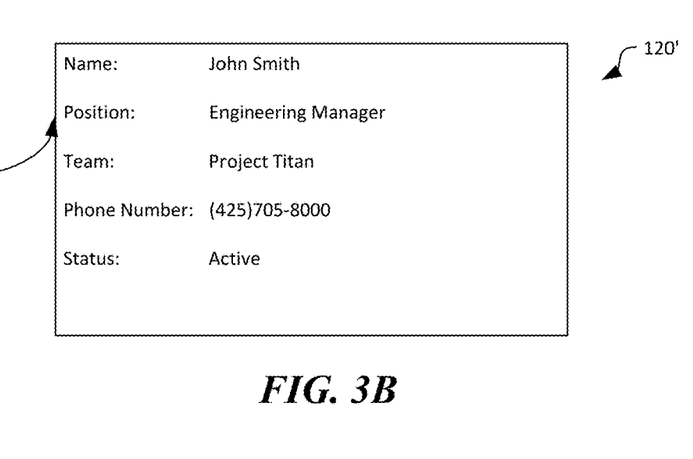

The individual record fields can also be linked to additional resource records 120. For example, as shown in FIGS. 3A and 3B, the resource record 120 of the document 110 can be linked to another resource field 120' of a person's name, i.e., "John Smith." The resource record 120' can contain additional and/or different record fields as that in the resource record 120. For instance, the resource record 120' can include "Name," "Position," "Team," "Phone number," and "Status" fields. In another example, the resource record 120' can also include a "Files Owned" filed configured to contain documents or other suitable types of files owned by "John Smith." In some embodiments, upon determining that "John Smith" has left the organization or team, the files identified in the "Files Owned" field can be transferred to another person or entity manually, automatically, or in other suitable manners. In other examples, the resource record 120' for "John Smith" can also include data fields configured to contain email addresses, physical locations, and/or other suitable information.

Figure 3C:
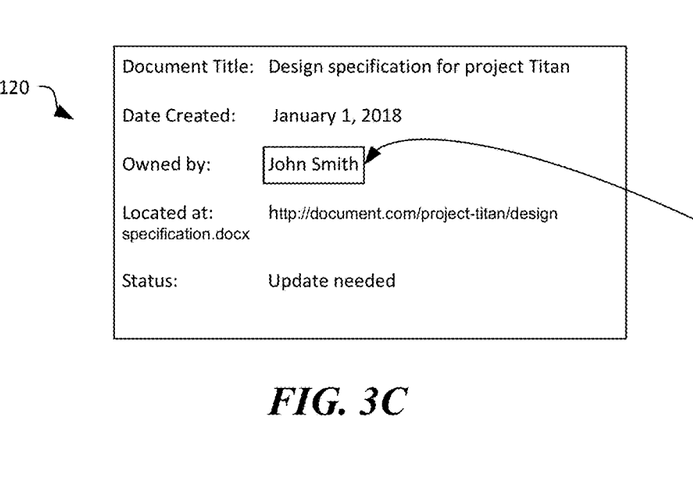
Figure 3D:
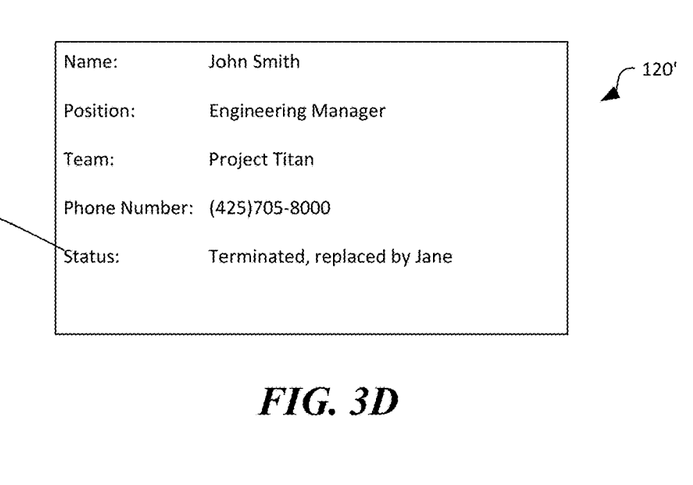

In accordance with embodiments of the disclosed technology, the resource updater 128 (FIG. 2A) of the resource manager 106 (FIG. 2A) can be configured to automatically update all linked resource records 120. For example, as shown in FIGS. 3C and 3D, upon detecting that a status of the resource record 120" corresponding to "John Smith" has changed, the resource updater 128 can be configured to automatically update the resource record 120 containing "John Smith" as a value for the "Owned by" record field to have a status of "Update needed." Based on such status values, the resource processor 122 can be configured to prompt the member 101 for updated and/or additional information regarding the person "John Smith" and an owner of the document 110.

Figure 4A:
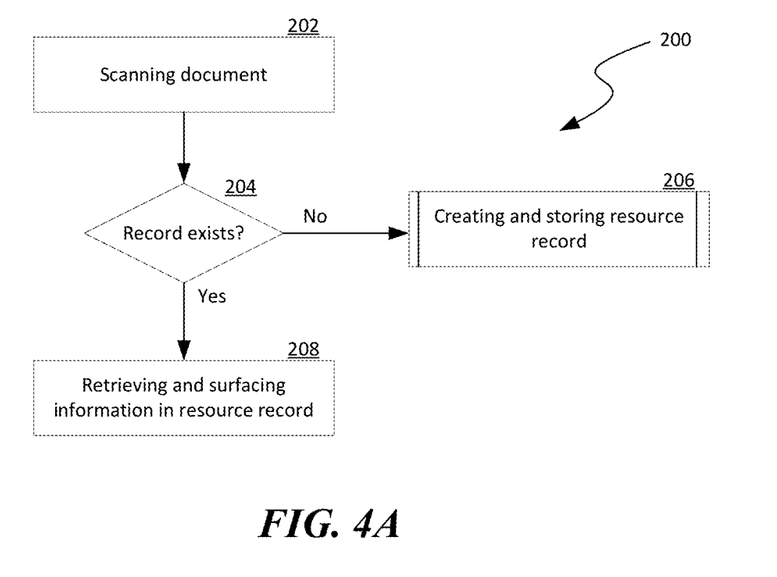
FIGS. 4A and 4B are flowcharts illustrating various aspects of a process of intelligent document management in accordance with embodiments of the disclosed technology.

FIG. 4A is a flowchart illustrating a process 200 of intelligent document management in accordance with embodiments of the disclosed technology. Even though embodiments of the process 200 are described in the context of the distributed computing system 100 and components of the resource manager 106 shown in FIGS. 1-2D, in other embodiments, the process 200 can also be implemented in computing systems with additional and/or different components.

As shown in FIG. 4A, the process 200 can include scanning a document for resources at stage 202. As described above with reference to FIGS. 2A-2D, such scanning can be based on one or more resource models 116 developed via machine learning, user configuration, and/or other suitable techniques. The process 200 can then include a decision stage 204 to determine whether a record of a detected resource is available. In response to determining that a resource record is available, the process 200 can include retrieving the resource record and surfacing suitable information (e.g., a status value) of the resource at stage 208.

In response to determining that a resource record is not available, the process 200 can include creating and storing a resource record at stage 206. Example operations of creating and storing a resource record are described in more detail below with reference to FIG. 4B.

Figure 4B:
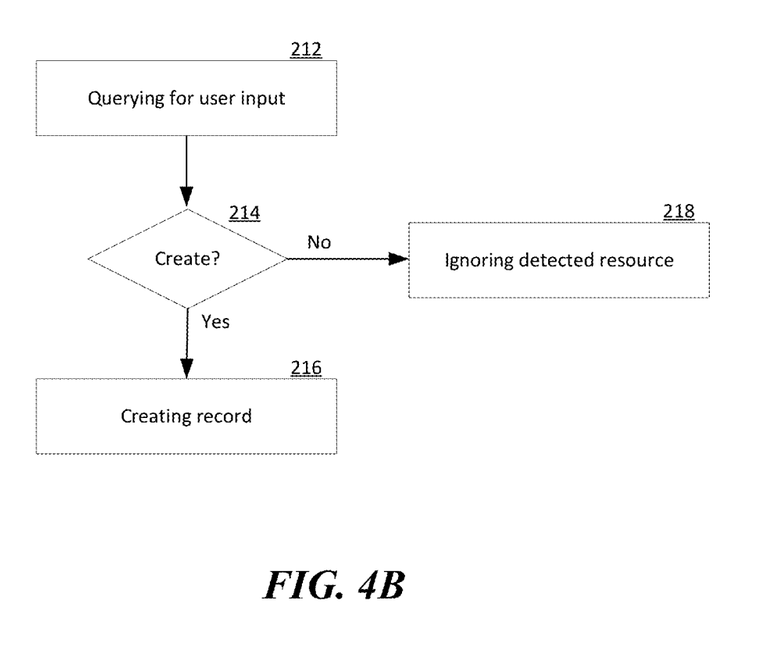

As shown in FIG. 4B, the example operations can include querying for user input on whether to create a resource record for a detected resource at stage 212. The operations can then include a decision stage 214 to determine whether the user input indicates to create a resource record. In response to receiving a user input indicating to create a resource record, the operations can include optionally querying the user for additional information and creating a resource record at stage 216. Otherwise, the operations include ignoring the detected resource in the document at stage 218.

Figure 5:
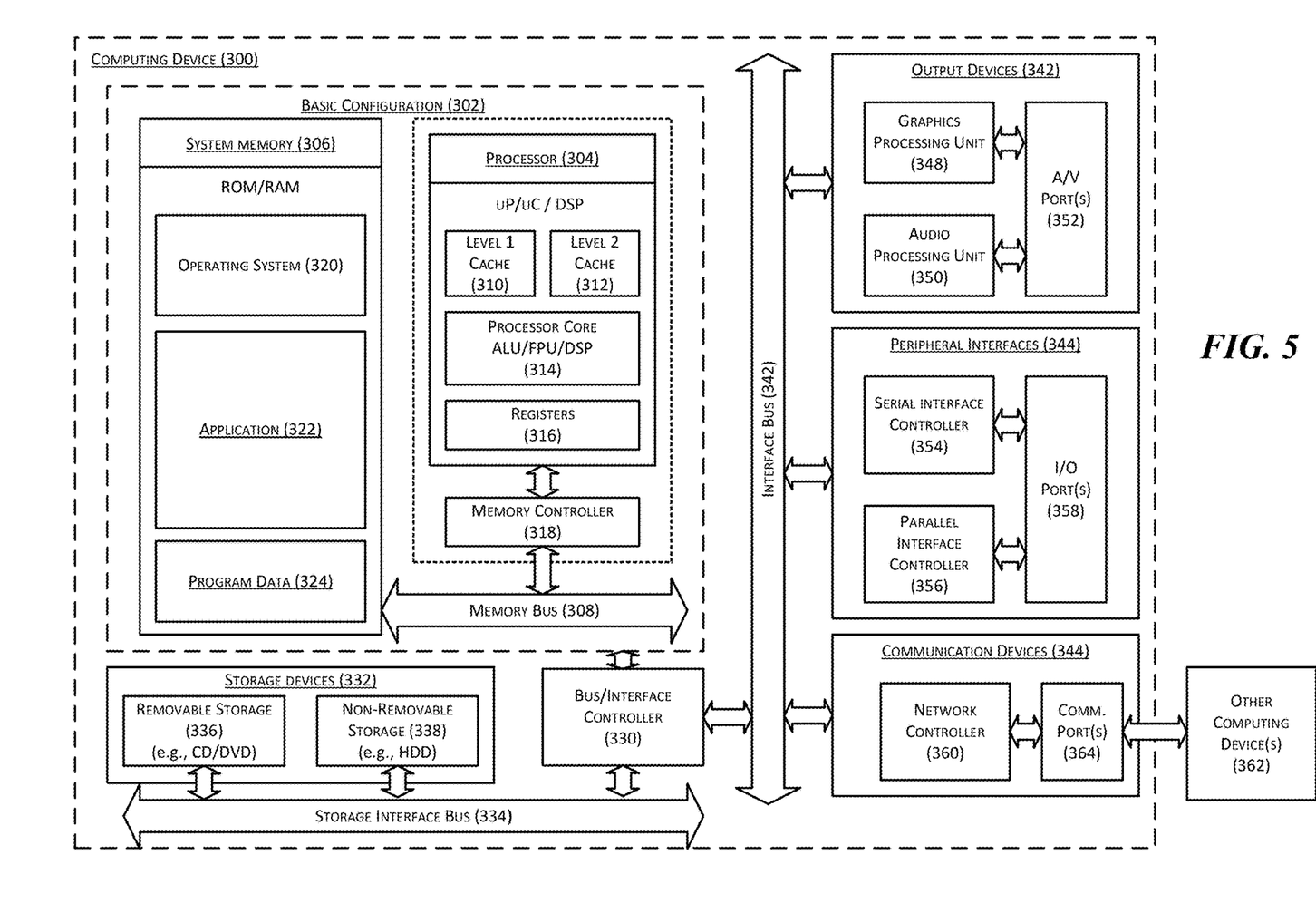
FIG. 5 is a computing device suitable for certain components of the distributed computing system in FIG. 1.

FIG. 5 is a computing device 300 suitable for certain components of the computing system 100 in FIG. 1. For example, the computing device 300 can be suitable for the client devices 102, resource manager 106, the file management server 114, or the web browser 118 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method for content management in a file management system containing multiple documents, the method comprising:
scanning a document to determine whether one or more words in the document represent a resource in the file management system based on a machine learning model or one or more user configured rules, the resource having linked data of additional information in the file management system;
in response to determining that one or more words in the document represents a resource, creating and storing a resource record corresponding to the resource in a database of the file management system, the resource record having a data field containing data representing a current validity status of the linked data of additional information of the resource; and
upon detecting viewing of the document by a reader,
retrieving the data in the data fields of the resource record from the database of the file management system corresponding to the resource; and
surfacing, in the viewed document, the retrieved data of the current validity status of the resource along with the one or more words to provide to the user, the current validity status of the linked data of additional information of the resource represented by the one or more words.

2. The method of claim 1 wherein creating the resource record includes:
outputting an option to create the resource record; and
in response to receiving a user input to the option instructing to create the resource record, creating the resource record in the file management system.

3. The method of claim 1 wherein creating the resource record includes:
outputting an option to create the resource record; and
in response to receiving a user input to the option instructing to create the resource record,
prompting a user for a current validity status of the detected resource; and
creating the resource record in the file management system, the resource record having the data field containing data representing the current validity status received from the user.

4. The method of claim 1 wherein:
the one or more words in the document represents a name of a person;
the linked data of additional information includes data representing one or more of a position, location, or title of the person in an organization; and
creating the resource record includes creating the resource record having the data field containing data representing a current employment status of the person in the organization.

5. The method of claim 1 wherein:
the one or more words in the document represents a name of a person;
the linked data of additional information includes data representing one or more of a position, location, or title of the person in an organization;
creating the resource record includes creating the resource record having the data field containing data representing a current employment status of the person in the organization; and
the method further includes:
receiving data from a directory service, the received data indicating an employment status change of the person in the organization; and
in response to receiving the data from the directory service, updating the data in the data field of the resource record to reflect the employment status change of the person.

6. The method of claim 1 wherein:
the one or more words in the document represents a name of a linked document in the file management system; and
creating the resource record includes creating the resource record having a first data field containing data representing a location in the file management system and a second data field containing data representing a current availability status of the linked document at the location in the file management system.

7. The method of claim 1 wherein:
the one or more words in the document represents a name of a linked document;
creating the resource record includes creating the resource record having a first data field containing data representing a location in the file management system and a second data field containing data representing a current availability status of the linked document at the location in the file management system; and
the method further includes:
determining whether the linked document is still valid at the location in the file management system; and
in response to determining that the linked document is not valid at the location in the file management system, updating the data in the second data filed to indicate that the current availability status of the linked document is invalid.

8. The method of claim 1 wherein:
the one or more words in the document represents a name of a linked document;
creating the resource record includes creating the resource record having a first data field containing data representing a location in the file management system and a second data field containing data representing a current availability status of the linked document at the location in the file management system; and
the method further includes:
determining whether the linked document is still valid at the location in the file management system; and
in response to determining that the linked document is not valid at the location in the file management system,
updating the data in the second data filed to indicate that the current availability status of the linked document is invalid;
wherein surfacing the retrieved data includes surfacing the data indicating that the linked document is invalid at the location.

9. The method of claim 1 wherein:
the one or more words in the document represents a name of a linked document;
creating the resource record includes creating the resource record having a first data field containing data representing a location in the file management system and a second data field containing data representing a current availability status of the linked document at the location in the file management system;

surfacing the retrieved data includes surfacing the data indicating that the linked document is invalid at the location; and the method further includes:
providing, to the user, one or more suggested documents having content similar to the linked document; and upon receiving a user input selecting one of the suggested documents, updating the first data field in the resource record to contain data representing a location of the selected suggested document.

10. A computing device in a file management system containing multiple documents, the computing device comprising:
a processor; and
a memory containing instructions executable by the processor to cause the computing device to:
scan a document viewed by a user to determine whether one or more words in the document represent a resource in the file management system based on a machine learning model or one or more user configured rules, the resource being a name of a person or a linked document in the file management system; and
in response to determining that one or more words in the document represents a resource,
retrieve a resource record corresponding to the resource from a database in the computing system, the resource record having a data field containing data representing a current validity status of the resource;
determine whether the current validity status of the resource in the retrieved resource record indicates that the resource is valid; and
in response to determine that the data representing the current validity status of the resource indicates that the resource is invalid,
surface a graphical interface element in the document to the user, the graphical interface element containing an input field for inputting an updated validity status of the resource; and
upon receiving an input to the input field, update the data in the data field in the resource record with the received input as the updated validity status of the resource and surfacing, in the document, the data of the updated validity status of the resource along with the one or more words to provide to the user, the updated validity status of the linked data of additional information of the resource represented by the one or more words.

11. The computing device of claim 10 wherein the memory contains additional instructions executable by the processor to cause the computing device to, in response to determine that the data representing the current validity status of the resource indicates that the resource is valid, surface, in the document, the retrieved data of the current validity status of the resource to the user.

12. The computing device of claim 10 wherein the memory contains additional instructions executable by the processor to cause the computing device to:
in response to determining that one or more words in the document represents another resource,
output an option to create another resource record; and
in response to receiving a user input to the option instructing to create the another resource record, creating and storing the another resource record in the file management system.

13. The computing device of claim 10 wherein the memory contains additional instructions executable by the processor to cause the computing device to:
in response to determining that one or more words in the document represents a resource,
prompt the user for the current validity status of the detected resource; and
update the resource record in the file management system with data representing the current validity status received from the user.

14. The computing device of claim 10 wherein:
the resource is a name of a person; and
the data field in the retrieved resource record contains data representing a current employment status of the person in an organization.

15. The computing device of claim 10 wherein:
the resource is a name of a linked document in the file management system;
the data field in the retrieved resource record is a first data field;
the resource record further includes a second data field containing data representing a location in the file management system; and
the first data field contains data representing a current availability status of the linked document at the location in the file management system.

16. The computing device of claim 10 wherein:
the resource is a name of a linked document in the file management system;
the data field in the retrieved resource record is a first data field;
the resource record further includes a second data field containing data representing a location in the file management system;
the first data field contains data representing a current availability status of the linked document at the location in the file management system; and
the memory contains additional instructions executable by the processor to cause the computing device to:
determine whether the linked document is still valid at the location in the file management system; and
in response to determining that the linked document is not valid at the location in the file management system, update the data in the second data filed to indicate that the current availability status of the linked document is invalid.

17. A method for intelligent content management in a file management system containing multiple documents, the method comprising:
upon detecting viewing of a document in the file management system by a reader,
determining whether one or more words in the document represent a resource in the file management system based on a machine learning model or one or more user configured rules, the resource being a name of a person or a linked document in the file management system; and
in response to determining that one or more words in the document represents a resource based on a machine learning model or one or more user configured rules,
retrieving a resource record corresponding to the resource from a database in the computing system, the resource record having a data field containing data representing a current validity status of the resource; and surfacing, in the document, the retrieved data of the current validity status of the resource along with the one or more words to provide to the user the current validity status of the linked data of additional information of the resource represented by the one or more words.

18. The method of claim 17, further comprising:

determining whether the current validity status of the resource in the retrieved resource record indicates that the resource is valid; and in response to determine that the data representing the current validity status of the resource indicates that the resource is invalid, surfacing a graphical interface element in the document to the user, the graphical interface element containing an input field for an updated status of the resource; and upon receiving an input to the input field, updating the data in the data field in the resource record with the updated status of the resource.

19. The method of claim 17 wherein:

the resource is a name of a person; and the data field in the resource record contains data representing a current employment status of the person in an organization.

20. The method of claim 17 wherein:

the resource is a name of a linked document in the file management system;

the data field in the retrieved resource record is a first data field;

the resource record further includes a second data field containing data representing a location in the file management system; and the first data field contains data representing a current availability status of the linked document at the location in the file management system.

* * * * *